Feb. 19, 1929.
A. FINN
1,703,030
AUTOMOBILE BUMPER
Filed March 27, 1928   2 Sheets-Sheet 1
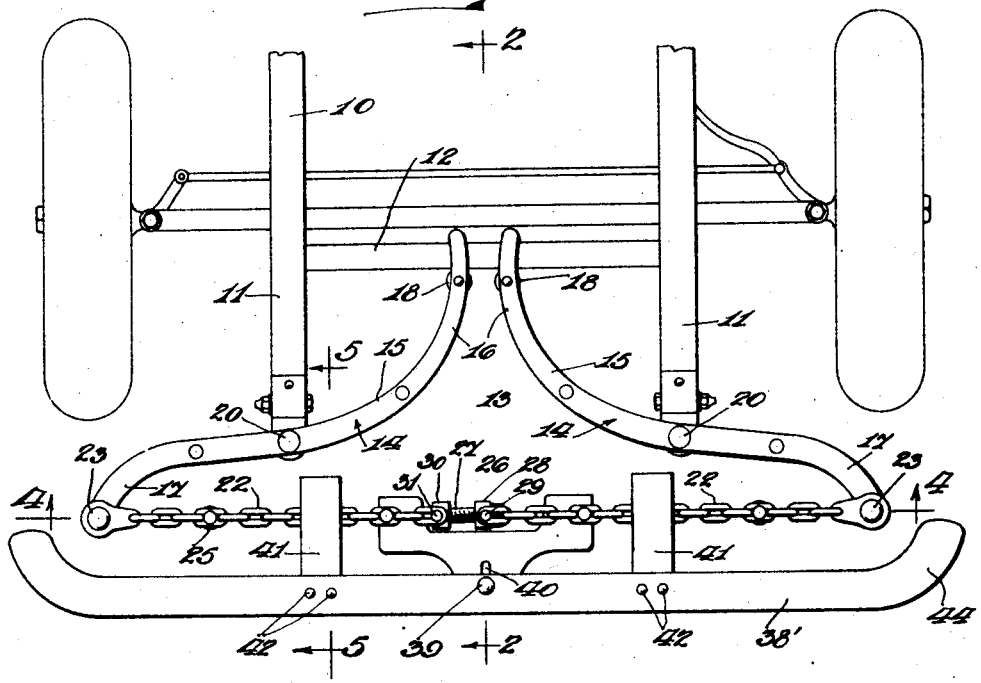
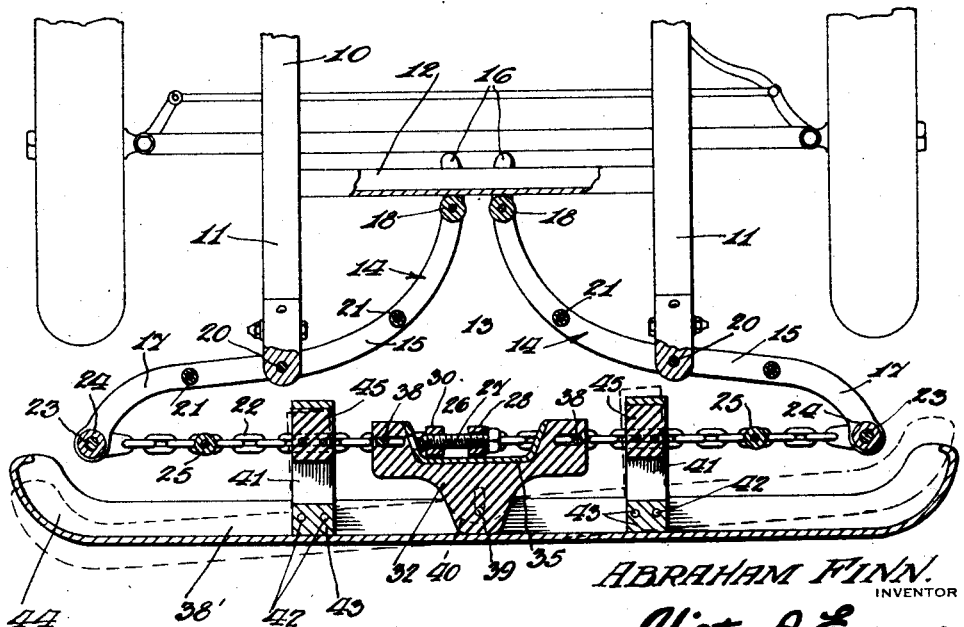
Abraham Finn, INVENTOR
BY Victor J. Evans, ATTORNEY
WITNESS:

Feb. 19, 1929.                                             1,703,030
A. FINN
AUTOMOBILE BUMPER
Filed March 27, 1928          2 Sheets-Sheet 2
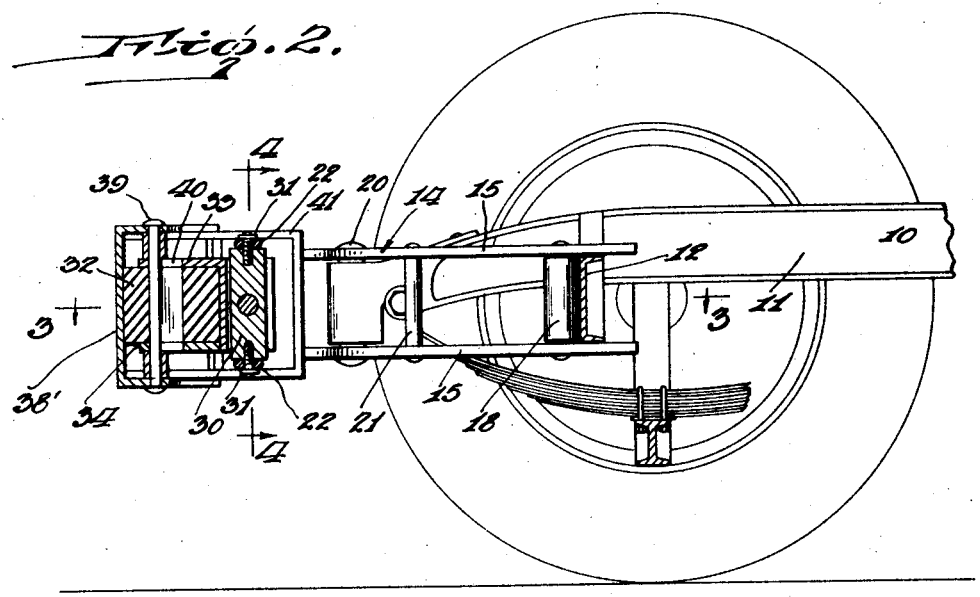
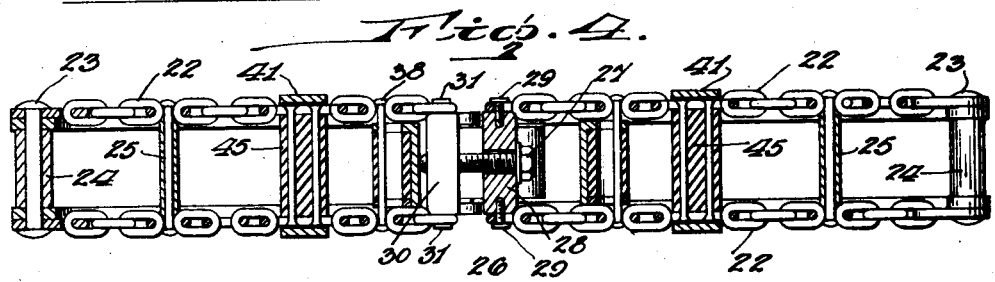
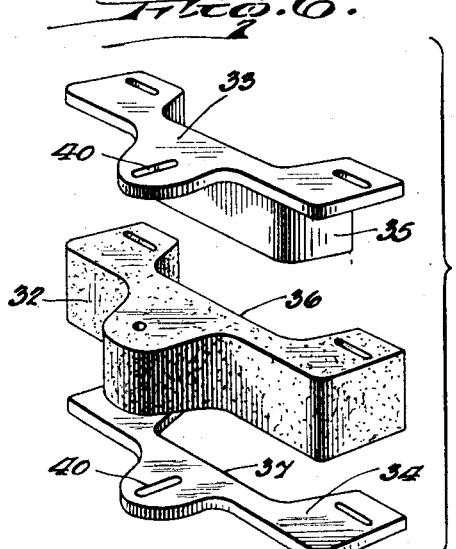
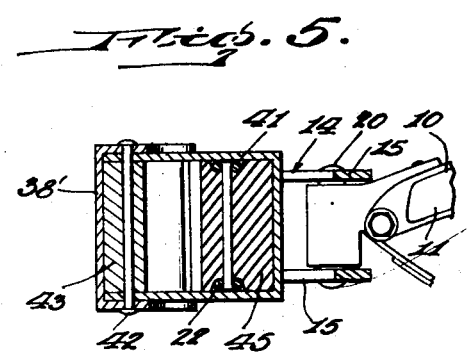
ABRAHAM FINN.
INVENTOR Patented Feb. 19, 1929.

1,703,030

UNITED STATES PATENT OFFICE.

ABRAHAM FINN, OF ELIZABETH, NEW JERSEY.

AUTOMOBILE BUMPER.

Application filed March 27, 1928. Serial No. 265,145.

This invention relates to automobile bumpers and is an improvement over the bumper shown and described in my Patent No. 1,658,764, granted February 7, 1928.

The primary object of the invention resides in a bumper construction for attachment to the front of a motor vehicle for arresting any shock and for preventing damage to the forward end of the vehicle should the same collide with another vehicle or object.

Another object of the invention is to pivotally and yieldingly support a transverse bumper bar forward upon an automobile which will yield when struck midway between its ends, and which will rock and also yield when struck off center to cushion the shock caused thereby.

With these and other objects in view, the invention resides in certain novel construction and combination and arrangement of parts, the essential features of which are hereinafter fully described, are particularly pointed out in the appended claims, and are illustrated in the accompanying drawing, in which:—

Figure 1 is a top plan view of the forward end of an automobile with my improved bumper mounted thereon.

Figure 2 is a vertical transverse sectional view on the line 2—2 of Figure 1.

Figure 3 is a horizontal sectional view on the line 3—3 of Figure 2.

Figure 4 is a vertical sectional view on the line 4—4 of Figure 2.

Figure 5 is a vertical transverse sectional view on the line 5—5 of Figure 1.

Figure 6 is a detail perspective view of the center cushion assembly in separated condition.

Referring to the drawings by reference characters, the numeral 10 designates the chassis of a motor vehicle which includes spaced longitudinal channel bars 11 which are held braced by a transverse channel bar 12. My improved bumper is shown in its entirety as at 13 and may be mounted on both the front and rear of a motor vehicle if desired.

The bumper includes a pair of identical arms 14, each of which comprises a pair of spaced parallel plates 15 having inwardly curved portions 16 and oppositely curved portions 17. The inner ends of the plates of each arm support a roller 18 which bears against the front of the cross piece 12 for limiting movement of the same in one direction. The arms 14 are pivotally mounted to the outer ends of the channel bars 11 as at 20 for a purpose to be presently explained. Collars 21 are interposed between the plates 15 of the arms 14 to maintain the same in spaced parallel relation.

Bridging the space between the arms 14 are spaced flexible tie elements or chains 22 which have their outer ends fixed to the curved ends 17 by bolts 23 which pass through the arms and through spacing collars 24. There are additional spacing collars 25 interposed between the chains to maintain them in even spaced relation. The meeting ends of the chains are joined by an adjusting device 26 which comprises a headed bolt 27 having a collar 28 mounted thereon and which collar is provided with pins 29 for receiving the inner end links of the chains 22 disposed on one side of the center of the bumper. The shank of the bolt is screw threaded to receive a nut 30 having outwardly extending lugs or pins 31 for the connection of the inner ends of the other chains 22. It will be seen that by turning the bolt in one direction, the nut will be fed toward the collar to bring the chains in a taut or substantially taut condition. Mounted between the chains 22 is a rubber cushion member 32 which is held spaced from the chain sections by wear plates 33 and 34. The plate 33 carries a skirt portion 35 for reception in a recess 36 in the cushion member, and a recess 37 in the wear plate 34. The skirt portion acts as a wall for preventing backward shifting of the cushion member. Retaining bolts 38 pass through links in the chain sections and registering slots in the wear plates 33 and 34 and cushion member for holding them in their proper positions. The cushion member and bearing plates have a central forwardly extending portion which is received between the flanges of a transverse bumper bar 38' constructed of channel material which is U-shaped in cross section. A pivot pin 39 passes through the cushion member, bearing plates and bumper bar at a point midway between the ends of the bumper bar while the bearing plates have elongated slots 40 through which the pivot pin passes to allow yielding movement of the pivot pin should the bumper bar come in contact with an object.

For yieldingly supporting the bumper bar on opposite sides of its pivot, I provide U-shape brackets 41 which embrace the transverse chains 22 and have their free ends bolted as at 42 to the flanges of the channel bumper bar 38'. Rubber cushion blocks 45 are interposed between the chains 22 and are held against backward shifting by brackets 41. Spacer blocks 43 are interposed between the fixed ends of the brackets to brace and strengthen the bumper bar. The outer free ends of the bumper are curved backward as at 44 and extend slightly beyond the plane of the wheels of the vehicle to shield them against damage in collision.

In practice, should the bumper bar come in contact with an obstacle and the center of the bumper should be struck, the bumper bar 38' will move backward by reason of the yielding qualities of the rubber cushion member 32, which of course will absorb any shock. Should the bumper bar strike an obstacle on either side of its pivoted center, the bumper bar will swing upon its pivot as shown in dotted lines in Figure 3 of the drawings whereupon the shock will be arrested by the rubber cushion blocks 45. The bracket 41 attached to the side of the bumper bar opposite to the side struck will compress the rubber bumper block which it engages while the opposite bracket will move rearwardly free of its adjacent bumper block. The function of the arms 14 and their correlated parts has been fully explained in my patent hereinbefore mentioned and in this instance they provide a novel means for the mounting or attaching my improved cushioning bumper to an automobile.

While I have described what I deem to be the most desirable embodiment of my invention, it is obvious that many of the details may be varied without in any way departing from the spirit of my invention, and I therefore do not limit myself to the exact details of construction herein set forth nor to anything less than the whole of my invention limited only by the appended claims.

What is claimed as new is:—

1. An automobile bumper comprising attaching arms, a tie element connected to said arms and bridging the space therebetween, a cushion member supported upon said tie element, and a bumper bar pivoted to said cushion member and disposed forward of said brace element.

2. An automobile bumper comprising attaching arms, a tie element connected to said arms and bridging the space therebetween, a cushion member supported upon said tie element, and a bumper bar pivoted to said cushion member and disposed forward of said tie element, and cushion devices between said tie element and bumper bar and disposed on opposite sides of said cushion member.

3. In an automobile bumper, spaced transverse chains, a cushion member interposed between said chains and extending forward beyond the same, and a bumper bar pivoted to said cushion member midway between its ends.

4. In an automobile bumper, spaced transverse chains, a cushion member interposed between said chains and extending forward beyond the same, and a bumper bar pivoted to said cushion member midway between its ends, cushion blocks interposed between said transverse chains on opposite sides of said cushion member, and brackets carried by said bumper bar and embracing said transverse chains and cushion blocks.

5. In an automobile bumper, a pair of spaced transverse chains fixedly secured together, a cushion member interposed between said transverse chains, bearing plates for said cushion member having elongated slots therein, a channel bumper bar into which said cushion member and plates extend, and a pivot pin passing through said bumper bar, cushion and slots of said plates for pivotally mounting said bumper bar forward of said transverse chains.

6. In an automobile bumper, a transverse element adapted to be mounted upon an automobile, a bumper bar pivotally supported forward of and by said transverse element, and cushion means for arresting shock caused by the bumper bar striking an obstacle.

7. In an automobile bumper, bumper supporting means adapted to be mounted upon an automobile, and a bumper bar pivotally supported midway between its ends upon said bumper supporting means.

8. In an automobile bumper, bumper supporting means adapted to be mounted upon an automobile, and a bumper bar pivotally supported midway between its ends upon said bumper supporting means, and cushion means between said bumper bar and said supporting means respectively disposed on opposite sides of the pivotal axis of said bumper bar.

In testimony whereof I have affixed my signature.

ABRAHAM FINN.